United States Patent Office 2,759,029
Patented Aug. 14, 1956

2,759,029

PREPARATION OF MONO-ALKYLATED AROMATIC COMPOUNDS

Louis Schmerling, Riverside, Ill., assignor to Universal Oil Products Company, Des Plaines, Ill., a corporation of Delaware No Drawing. Application December 23, 1954, Serial No. 477,384

20 Claims. (Cl. 260—671)

This application is a continuation-in-part of my copending application, Serial No. 396,345, filed December 4, 1953.

This invention relates to a process for the mono-alkylation of aromatic compounds, and more particularly to a process for improving the yields of mono-alkylated aromatic compounds.

An object of this invention is to prepare monoalkylated aromatic compounds by reacting a polyhaloalkane with an alkylatable aromatic compound and a saturated hydrocarbon.

A further object of this invention is to improve the yields of mono-alkylated aromatic compounds obtained by reacting a polyhaloalkane with an alkylatable aromatic compound containing a replaceable hydrogen atom and a saturated hydrocarbon containing a tertiary carbon atom.

One embodiment of this invention resides in a process for the production of derivatives of aromatic compounds by reacting an aromatic compound with a polyhaloalkane and a saturated hydrocarbon containing a tertiary carbon atom in the presence of a Friedel-Crafts type catalyst, and recovering the resultant derivatives of the aromatic compound.

Another embodiment of the invention is found in a process for the production of derivatives of aromatic hydrocarbons which comprises reacting an aromatic hydrocarbon with a polyhaloalkane containing at least one halogen atom attached to a carbon atom to which is attached not more than one hydrogen atom and a saturated hydrocarbon containing a tertiary carbon atom in the presence of a Friedel-Crafts catalyst, and recovering the resultant derivatives of the aromatic hydrocarbon.

A further embodiment of this invention resides in a process for the production of derivatives of aromatic hydrocarbons by reacting an aromatic hydrocarbon with a polychloroalkane containing at least one chlorine atom attached to a carbon atom to which is attached not more than one hydrogen atom and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant derivatives of the aromatic hydrocarbon.

A specific embodiment of this invention is found in a process for preparing mono-alkylated benzenes by treating benzene with a polychloroalkane and an alkylcycloparaffin in the presence of aluminum chloride, and recovering the resultant mono-alkylated benzenes.

A more specific embodiment of this invention resides in a process for preparing mono-alkylated benzenes which comprises treating benzene with 1,2-dichloro-2-methylpropane and methylcyclopentane in the presence of aluminum chloride, and recovering the resultant isobutylbenzene and (methylcyclopentyl)benzene.

Other objects and embodiments of this invention referring to alternative polyhaloalkanes and to alternative saturated hydocarbons containing a tertiary carbon atom will be referred to in the following further detailed description of this invention.

It has previously been found that the alkylation of benzene with a dichloroalkane in the presence of aluminum chloride, for example, yields diphenylalkane as the chief product of the reaction. In some cases, very minor amounts of a monophenylalkane (i. e., a monoalkylbenzene) are also formed. I have now found that the monoalkylbenzene can be produced as the chief product to the exclusion, in many cases, of even minor amounts of the diphenylalkane by carrying out the reaction between the benzene and the dichloroalkane in the added presence of a satuarted hydrocarbon containing a tertiary carbon atom, such as methylcyclopentane. The use of the saturated hydrocarbon has the advantage not only that it causes the formation of good yields of otherwise difficultly obtainable alkylbenzenes such as isobutylbenzene and neohexylbenzene (i. e. 1-phenyl-3,3-dimethylbutane), but also that it brings about the alkylation of benzene with the saturated hydrocarbon thus practically doubling the yield of monoalkylbenzene. It is to be understood that the terms "mono-alkylated aromatic compound" or "monoalkylbenzene," as used herein, refer to an aromatic compound in which a hydrogen atom is replaced by an alkyl, cycloalkyl, cycloalkylalkyl, or aralkyl radical.

The mono-alkylated aromatic compounds prepared by the method of the present invention may be used as intermediates in the preparation of detergents (for example, by sulfonation), pharmaceuticals, resins, fine chemicals, etc.

The observation that the saturated hydrocarbon enters into the reaction is illustrated by the equation set forth below:

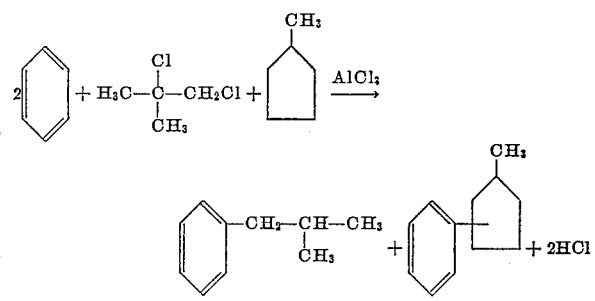

Suitable saturated hydrocarbons which may be used in the process of this invention include isobutane, isopentane, 2-methylpentane, 3-methylpentane, 2,3-dimethylbutane, etc., methylcyclopentane, ethylcyclopentane, propylcyclopentane, methylcyclohexane, ethylcyclohexane; propylcyclohexanes, 1,2-dimethylcyclopentane, 1,2-diethylcyclopentane, 1,2-dimethylcyclohexane, 1,2-diethylcyclohexane, etc., decahydronaphthalene, alkyldecahydronaphthalenes, etc. In some cases, saturated hydrocarbons which isomerize under the reaction conditions to yield saturated hydrocarbons containing tertiary carbon atoms may also be used.

The alkylating agents, comprising polyhaloalkanes, the preferred halogen atoms being chlorine and bromine, which may be used within the scope of this invention include carbon tetrachloride, bromotrichloromethane, chloroform, 1,1-dichloromethane, 1,1-dichloroethane, 1,1-dibromoethane, 1,1,2-trichloroethane, 1,1,2-tribromoethane, 1,1-dichloropropane, 1,2-dichloropropane, 1,1-dibromopropane, 1,2-dibromopropane, 1,2-trichloropropane, 1,1,2-tribromopropane, 1,1,3,3-tetrachloropropane, 1,1,3,3-tetrabromopropane, 1,1-dichlorobutane, 1,2-dichlorobutane, 2,2-dichlorobutane, 2,3-dichlorobutane, 1,1-dibromobutane, 1,2-dibromobutane, 2,3-dibromobutane, 1,1,2-trichlorobutane, 1,1,3-tribromobutane, 1,2-dichloro-2-methylpropane, 1,2-dibromo-2-methylpropane, poly-chlorinated and poly-brominated pentanes, hexanes, etc. In addition, polyhaloalkanes, characterized by containing a quaternary carbon atom, such as those which may be obtained, for example, by the reaction of a saturated tertiary halide (i. e. a tertiary alkyl or cycloalkyl halide such as t-butyl chloride, or 1-methyl-1-chlorocyclohexane) with a vinyl halide may also be used in this invention. These polyhaloalkanes include 1,1-dichloro-2,2-dimethylpropane, 1,1-dibromo-2,2-dimethylpropane, 1,1-dichloro-3,3-dimethylbutane, 1,1-dibromo-3,3-dimethylbutane, 1,2-dichloro-3,3-dimethylbutane, 1,1,2-trichloro-3,3-dimethylbutane, 1,1,2-tribromo-3,3-dimethylbutane, 1,1-dichloro-3-methyl-3-ethylbutane, 1,1-dibromo-3-methyl-3-ethylbutane, 1,1,2-trichloro-3-methyl-2-ethylbutane, 1,1,2-tribromo-3-methyl-3-ethylbutane, 1,1-dichloro-3,3-diethylbutane, 1,1-dibromo-3,3-diethylbutane, 1,1,2-trichloro-3,3-diethylbutane, 1,1,2-tribromo-3,3-diethylbutane, 1,1-dichloro-3,3-dimethylpentane, 1,1-dibromo-3,3-dimethylpentane, 1,1,2-trichloro-3,3-dimethylpentane, 1,1,2-tribromo-3,3-dimethylpentane, 1,1-dichloro-3,3-diethylpentane, 1,1-dibromo-3,3-diethylpentane, 1,2-dichloro-3,3-diethylpentane, 1,2-dibromo-3,3-diethylpentane, 1,1,2-trichloro-3,3-diethylpentane, 1,1,2-tribromo-3,3-diethylpentane, 1,1-dichloro-4,4-dimethylpentane, 1,2-dichloro-4,4-dimethylpentane, 1,2,3-trichloro-4,4-dimethylpentane, 1,1-dibromo-4,4-dimethylpentane, 1,2-dibromo-4,4-dimethylpentane, 1,1-dichloro-4-methyl-4-ethylpentane, 1,1-dibromo-4-methyl-4-ethylpentane, 1,1-dichloro-3,3-dimethylhexane, 1,1-dichloro-4,4-dimethylhexane, 1,1-dichloro-5,5-dimethylhexane, 1,1-dibromo-3,3-dimethylhexane, 1,2-dibromo-3,3-dimethylhexane, 1,2-dichloro-3,3-dimethylhexane, 1,1-dichloro-2-cyclohexylethane, 1,1-dibromo-2-cyclohexylethane, and the like. The preferred polyhalides for the process of this invention are those containing at least one halogen atom attached to a carbon atom to which is attached not more than one hydrogen atom, the preferred halogens being chlorine and bromine.

Aromatic compounds which may be alkylated by the aforementioned alkylating agents in the process of this invention are those which contain a replaceable hydrogen atom and include benzene, toluene, xylenes, 1,2,3-trimethylbenzene, 1,2,4-trimethylbenzene, etc., ethylbenzene, propylbenzenes, butylbenzenes, etc.; 1,2-diethylbenzene, 1,2,3-triethylbenzene, 1,2,4-triethylbenzene, 1,2-dipropylbenzene, 1,3-dipropylbenzene, 1,4-dipropylbenzene, 1,2,3-tripropylbenzene, 1,2,4-tripropylbenzene, etc.; naphthalene, 1-methylnaphthalene, 2-methylnaphthalene, 1-ethylnaphthalene, 2-ethylnaphthalene, 1-propylnaphthalene, 2-propylnaphthalene, etc.; 1,4-dimethylnaphthalene, 1,2-diethylnaphthalene, 1,5-dipropylnaphthalene, etc.; 1,2,3-trimethylnaphthalene, 1,2,4-trimethylnaphthalene, 1,2,3-triethylnaphthalene, etc.; 1,2,3,4-tetrahydronaphthalene; indene; indan, etc.; anthracene, 2-methylanthracene, 1-methylanthracene, 1-ethylanthracene, 2-ethylanthracene, 9,10-dimethylanthracene, 1,2-diethylanthracene, etc.; 9,10-dipropylanthracene, etc.; phenanthrene, 1-methylphenanthrene, 2-methylphenanthrene, etc.; 1-ethylphenanthrene, 2-ethylphenanthrene, etc.; 1,2-dimethylphenanthrene, 1,3-dimethylphenanthrene, 1,2-diethylphenanthrene, etc.; chrysene, 1-methylchrysene, 2-methylchrysene, 1,2-dimethylchrysene, 1,3-diethylchrysense, etc.; pyrene, 1-methylpyrene, 2-methylpyrene, etc.; 1-ethylpyrene, 2-ethylpyrene, etc.; 1,2-dimethylpyrene, etc. It is understood that the above mentioned aromatic compounds are set forth only as examples of the compounds which may be used in this process and that any aromatic compounds which will undergo alkylation in a condensation reaction with an alkylating agent may be used in the process of the present invention. This will include substituated aromatic compounds other than those enumerated above such as the phenols and halogen-substituted benzenes such as chlorobenzene, bromobenzene, dichlorobenzene, dibromobenzene, etc., and the like.

The reaction conditions under which the process of the present invention proceeds will depend largely upon the reactants and the catalyst used. The reaction is usually catalyzed by the use of a Friedel-Crafts type catalyst, the preferred catalysts comprising aluminum chloride, aluminum bromide, zirconium chloride and boron fluoride, although other metallic halides of this class such as ferric chloride may be used, but not necessarily with equivalent results. Generally, temperatures ranging from about —20° to about 150° C. or more will be used in the reaction, the preferred range, especially when aluminum chloride is used to catalyze the reaction, being in the range of from about 0° to about +80° C.

The process of this invention may be effected in any suitable manner and may comprise either a batch or continuous type operation. When a batch type operation is used, a quantity of the starting material, namely, the alkylating agent, the aromatic hydrocarbon and the saturated hydrocarbon containing a tertiary carbon atom are gradually added to a mixture of the aromatic hydrocarbon and the catalyst in a suitable reaction vessel provided with stirring means. The vessel is then heated or cooled to the desired temperature depending upon the reactants and catalysts used in the process. After a predetermined reaction time has elapsed, the desired reaction product is separated from the catalyst layer and recovered from the unreacted starting material by conventional means, for example, by washing, drying and fractional distillation.

Another method of operation of the present process is of the continuous type. A particularly suitable type of operation comprises a fixed bed type in which the condensation catalyst is disposed as a bed in a reaction zone, said zone being maintained at suitable operating conditions of temperature and pressure. The aromatic compound, saturated hydrocarbon and the alkylating agent are passed therethrough in a continuous stream in either an upward or downward flow. Alternatively, a mixture of aromatic compound, saturated hydrocarbon and catalyst in one stream and the polyhaloalkane, dissolved, if desired, in aromatic compound or saturated hydrocarbon, in another stream are introduced into the reaction zone. The alkylation of the aromatic hydrocarbon will continue until the desired time has elapsed after which the reaction product will be continuously withdrawn from the reaction zone, the liquid product separated from the catalyst and distilled to yield unreacted alkylating agent, aromatic compound and the saturated compound, the latter three being recycled for use as a portion of the starting material while the monoalkylated aromatic compounds will be withdrawn and purified by conventional means hereinbefore set forth. The reaction zone in which the reaction takes place will be an unpacked vessel or coil or it may contain fire brick, alumina, dehydrated bauxite, and the like.

Other continuous types of processes which may be used in this invention include the fluidized type of operation, the compact moving bed type of operation, and the slurry type process.

The following examples are given to illustrate the process of this invention which, however, are not intended to limit the generally broad scope of the present invention in strict accordance therewith.

*Example I*

A solution of 85 g. of 1,1-dichloro-3,3-dimethylbutane and 90 g. of benzene was added during a period of one hour to a stirred mixture of 234 g. of benzene, 150 g. of methylcyclopentane and 20 g. of aluminum chloride at a temperature of approximately 30° C. Stirring was continued for three hours after which the 483 g. of the upper layer was decanted from the 65 g. of lower catalyst layer, washed with water, dried and subjected to fractional distillation. 54 g. of neohexylbenzene (corresponding to a 60% yield) was obtained from the reaction mixture. There was also obtained about 42 g. (48% yield) of (methylcyclopentyl)benzene, boiling at 224–232° C. This consisted principally of secondary cycloalkylbenzene containing very little, if any of the (1-methylcyclopentyl)benzene isomer. It should be noted that the yields in this and other examples in which a saturated hydrocarbon was used are based on the reaction of one mole each of the polyhalide and the saturated hydrocarbon with two moles of benzene and are calculated on the reactant present in smallest mount, namely the polyhalide.

To show the advantage in obtaining greater yields of mono-alkylated aromatic compounds by the addition of a saturated hydrocarbon to the reaction mixture, the above experiment was repeated; however, the saturated hydrocarbon containing a tertiary carbon atom, namely methylcyclopentane was omitted.

A solution of 85 g. of 1,1-dichloro-3,3-dimethylbutane and 90 g. of benzene was slowly added during a period of 1.5 hours to a stirred mixture of 234 g. of benzene and 8 g. of aluminum chloride at a temperature of approximately 3° C. Stirring was continued for an addtional hour after which the 346 g. of the upper layer was decanted from the 44 g. of lower catalyst layer, washed with water, dried and distilled. There was obtained 23 g. (26% yield) of neohexylbenzene (1-phenyl-3,3-dimethylbutane) and 25 g. (19% yield) of 1,1-diphenyl-3,3-dimethylbutane.

*Example II*

A solution of 49 g. of 1,1-dichloroethane in 40 g. of benzene was added to a stirred mixture comprising 166 g. of methylcyclopentane, 160 g. of benzene and 5 g. of aluminum chloride during a period of 1.5 hours at about 3° C. after which the resulting mixture was stirred for another 4 hours at a temperature of approximately 3° C. 394 g. of the upper layer was decanted from the 16 g. of catlyst layer, washer with water, dried and subjected to fractional distillation. 42 g. of ethylbenzene corresponding to a 42% yield was recovered therefrom along with 30 g. of (methylcyclopentyl)benzene (corresponding to a 38% yield based on the reaction between one mole each of 1,1-dichloroethane and methylcyclopentane and two moles of benzene).

The advantage of using the saturated hydrocarbon is apparent from the following experiment in which none was used. 49 g. of 1,1-dichloroethane in 40 g. of benzene was slowly added to a stirred mixture of 160 g. of benzene and 5 g. of aluminum chloride during a period of 1.5 hours. The mixture was subsequently stirred for an additional period of 3.5 hours at a temperature of approximately 3° C. The 216 g. of the upper layer was decanted from the 27 g. of the lower catalyst layer, washed with water, dried and subjected to fractional distillation. Approximately 1 g. of ethylbenzene (corresponding to a 2% yield) was recovered therefrom. The chief product was 1,1-diphenylethane obtained in 33% yield.

*Example III*

The reaction of 1,1-dichloroethane with benzene and methylcyclopentane described in Example II was repeated, but at a higher temperature, 39–41° C. There was obtained 33 g. (62% yield) of ethylbenzene and 48 g. (60% yield) of (methylcyclohexyl)benzene.

*Example IV*

A solution of 50 g. of 1,1-dichloroethane in 41 g. of benzene was added during 1.5 hours to a stirred mixture of 160 g. of benzene, 150 g. of decahydronaphthalene, and 5 g. of aluminum chloride at 2–4° C. Stirring was continued for an additional 1.3 hours at this temperature after which the 342 g. of upper layer was separated from 29 g. of lower layer, washed, dried and distilled. There was obtained 23 g. (43% yield) of ethylbenzene and 75 g. (70% yield) of phenyldecahydronaphthalene. The structure of the latter was shown by dehydrogenation to the known 2-phenylnaphthalene.

*Example V*

The following experiment illustrates the use of a paraffin as the saturated hydrocarbon. A solution of 94 g. of 1,1-dibromoethane in 40 g. of benzene was added during 1.5 hours to a stirred mixture of 160 g. benzene, 129 g. 2,3-dimethylbutane and 5 g. aluminum chloride. Stirring was continued for an additional 6.2 hours, the temperature being allowed to rise to 32° C. The 372 g. of upper layer was separated from 28 g. of lower layer, washed, dried and subjected to fractional distillation. There was obtained 18 g. (34% yield) of ethylbenzene and 17 g. (21% yield) of a fraction consisting chiefly of the 2-phenyl-3,3-dimethylbutane formed by the alkylation of benzene with the dimethylbutane.

*Example VI*

A number of experiments were carried out following the procedure of Example II using various 1,1-dichloroalkanes. With 1,1-dichlorobutane as dichloride and methylcyclohexane as saturated hydrocarbon at 2–4° C. there was obtained a 63% yield of n-butylbenzene and a 64% yield of (methylcyclohexyl)benzene; in the absence of the saturated hydrocarbon, less than 3% of butylbenzene was obtained, the chief product being 1,1-diphenylbutane obtained in 36% yield. Use of 1,1-dichloro-2-methylpropane and methylcyclohexane at 3° C. resulted in a 49% yield of isobutylbenzene and a 42% yield of (methylcyclohexyl)benzene. Use of 1,1-dibromo-2-cyclohexylethane (prepared by the condensation of vinyl bromide and cyclohexyl bromide) and isopentane at 0–26° C. gave a 40% yield of (2-cyclohexylethyl)benzene and a 12% yield of pentylbenzene comprising 85–90% 2-phenyl-3-methylbutene and 10–15% t-pentylbenzene.

*Example VII*

A solution of 63 g. of 1,2-dichlorobutane and 40 g. of benzene was added to a stirred mixture containing 196 g. of methylcyclohexane, 160 g. of benzene and 5 g. of aluminum chloride at 3° C. during a period of one hour. The reaction mixture was subsequently stirred for an additional three hours at a temperature of 3° C. At the end of this time, 427 g. of upper layer was decanted from 21 g. of the lower layer, washed with water, dried and subjected to fractional distillation. There was obtained 5 g. of sec-butylbenzene (7% yield), 6 g. of (methylcyclohexyl)benzene (7% yield), 42 g. of (chlorobutyl)benzene (50% yield) and 7 g. of diphenylbutane (7% yield).

That the saturated hydrocarbon had a definite effect on the course of the reaction is shown by the results of the following experiment, in which no methylcyclohexane was used. A solution consisting of 63 g. of 1,2-dichlorobutane and 40 g. of benzene was slowly added during a period of one hour to a stirred mixture of 160 g. of benzene and 5 g. of aluminum chloride at 4–6° C. The resulting mixture was subsequently stirred for approximately 3 hours at a temperature of 5° C. At the end of this time, 231 g. of upper layer was decanted from 24 g. of lower layer, washed with water, dried and subjected to fractional distillation. There was obtained 31 g. (37% yield of (chlorobutyl)benzene and 8 g. (8% yield) of diphenylbutane; no butylbenzene was isolated.

*Example VIII*

A solution of 55 g. of 2,3-dibromobutane in 40 g. benzene was added during 0.6 hour to a stirred mixture of 160 g. benzene, 125 g. methylcyclopentane and 5 g. aluminum chloride at 28–29° C. Stirring was continued for 1.2 hours at this temperature and the 338 g. of upper layer was then decanted from 26 g. of lower layer, washed, dried and distilled. There was obtained 23 g. (68% yield) of sec-butylbenzene and 24 g. (60% yield) of (methylcyclopentyl)benzene.

When the above experiment was repeated in the absence of saturated hydrocarbon, sec-butylbenzene was obtained in only 6% yield (2 g.), the chief product being crystalline 2,3-diphenylbutane obtained in 50% yield (26 g.).

*Example IX*

A solution of 63 g. of 1,2-dichloro-2-methylpropane and 40 g. of benzene was added slowly during a period of one hour to a stirred mixture of 150 g. of methylcyclohexane, 160 g. of benzene and 5 g. of aluminum chloride at 3–4° C. The resulting mixture was subsequently stirred for a period of 1.5 hours at a temperature of 3° C. At the end of this time, 367 g. of upper layer was decanted from 17 g. of lower catalyst layer, washed, dried and subjected to fractional distillation. There was obtained 38 g. of isobutylbenzene (57% yield), 61 g. of (methylcyclohexyl)benzene (70% yield), and 16 g. of (isobutylphenyl)methylcyclohexane (14% yield).

The experiment was repeated in the absence of methylcyclohexane. A solution of 63 g. of 1,2-dichloro-2-methylpropane in 40 g. of benzene was added to a stirred mixture of 160 g. of benzene and 5 g. of aluminum chloride at 2–4° C. during a period of one hour. The resulting mixture was subsequently stirred for an additional 1.5 hours at a temperature of approximately 3° C. At the end of this time the 209 g. of upper layer was decanted from 29 g. of lower catalyst layer, washed with water, dried and subjected to fractional distillation. Not more than 1 g. of isobutylbenzene (less than 1% yield) was obtained. The chief product was 52 g. of diphenylbutane (50% yield) consisting of 1,2-diphenyl-2-methylpropane containing about 2.5% crystalline 2,3-diphenylbutane.

*Example X*

A solution of 32 g. of 1,2-dichloro-2-methylpropane in 20 g. of benzene was added during one-half hour to a stirred mixture of 80 g. of benzene, 75 g. of methylcyclohexane and 6 g. of zirconium chloride at 26° C. Stirring was continued for an additional 1.5 hours at 26–30° C. after which the 181 g. of upper layer was separated from the 10 g. of lower layer, washed, dried and subjected to fractional distillation. There was obtained 10 g. (30% yield) of isobutylbenzene, 15 g. (34% yield) of (methylcyclohexyl)benzene, and 16 g. (30% yield) of diphenylbutane.

*Example XI*

To a stirred mixture of 150 g. of benzene, 144 g. of isopentane, and 5 g. of aluminum chloride at 24–25° C., there was added during one hour a solution of 38 g. of carbon tetrachloride in 45 g. of benzene. Stirring was continued at 24–28° C. for 3.5 hours. The upper layer (324 g.) was separated from the 18 g. of lower layer, washed, dried and distilled. There was obtained 22 g. (24% yield) of diphenylmethane and 9 g. (30% yield based on a theoretical yield of 2 moles of product per mole of carbon tetrachloride) of pentylbenzene shown by means of its infrared spectrum, to consist of 65–75% 2-phenyl-3-methylbutane and 30–35% t-pentylbenzene.

The reaction of carbon tetrachloride with benzene in the presence of aluminum chloride but in the absence of a saturated hydrocarbon containing a tertiary carbon atom yields triphenylmethane or triphenylmethyl chloride, depending on the reaction conditions.

I claim as my invention:

1. A process for the production of derivatives of aromatic compounds which comprises reacting an aromatic compound selected from the group consisting of aromatic hydrocarbons and nuclearly substituted hydroxy and halogen derivatives thereof with a polyhaloalkane and a saturated hydrocarbon containing a tertiary carbon atom in the presence of a Friedel-Crafts catalyst, and recovering the resultant derivatives of the aromatic compound.

2. A process for the production of aromatic hydrocarbons which comprises reacting an aromatic hydrocarbon with a polyhaloalkane and a saturated hydrocarbon containing a tertiary carbon atom in the presence of a Friedel-Crafts catalyst, and recovering the resultant derivatives of the aromatic hydrocarbon.

3. A process for the production of derivatives of aromatic hydrocarbons which comprises reacting an aromatic hydrocarbon with a polyhaloalkane containing at least one halogen atom attached to a carbon atom to which is attached not more than one hydrogen atom and a saturated hydrocarbon containing a tertiary carbon atom in the presence of a Friedel-Crafts catalyst, and recovering the resultant derivatives of the aromatic hydrocarbon.

4. A process for the production of derivatives of aromatic hydrocarbons which comprises reacting an alkylatable aromatic hydrocarbon with a polychloroalkane containing at least one chlorine atom attached to a carbon atom to which is attached not more than one hydrogen atom and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant derivatives of the aromatic hydrocarbon.

5. A process for the production of derivatives of aromatic hydrocarbons which comprises reacting an alkylatable aromatic hydrocarbon with a polybromoalkane containing at least one bromine atom attached to a carbon atom to which is attached not more than one hydrogen atom and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant derivatives of the aromatic hydrocarbon.

6. A process for the production of derivatives of aromatic hydrocarbons which comprises reacting an alkylatable aromatic hydrocarbon with a dichloroalkane containing at least one chlorine atom attached to a carbon atom to which is attached not more than one hydrogen atom and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant derivatives of the aromatic hydrocarbon.

7. A process for the production of derivatives of aromatic hydrocarbons which comprises reacting an alkylatable aromatic hydrocarbon with a trichloroalkane containing at least one chlorine atom attached to a carbon atom to which is attached not more than one hydrogen atom and a saturated hydrocarbon containing a tertiary carbon atom in the presence of a Friedel-Crafts type catalyst selected from the group consisting of aluminum chloride, aluminum bromide, zirconium chloride and boron fluoride, and recovering the resultant derivatives of the aromatic hydrocarbon.

8. A process for the production of derivatives of aromatic hydrocarbons which comprises reacting an alkylatable aromatic hydrocarbon with a polychloroalkane containing at least one chlorine atom attached to a carbon atom to which is attached not more than one hydrogen atom and an isoparaffin in the presence of a Friedel-Crafts type catalyst selected from the group consisting of aluminum chloride, aluminum bromide, zirconium, chloride and boron fluoride, and recovering the resultant derivatives of the aromatic hydrocarbon.

9. A process for the production of derivatives of aromatic hydrocarbons which comprises reacting an alkylatable aromatic hydrocarbon with a polychloroalkane containing at least one chlorine atom attached to a carbon atom to which is attached not more than one hydrogen atom and an alkylcycloparaffin containing a tertiary carbon atom, in the presence of a Friedel-Crafts type catalyst selected from the group consisting of aluminum chloride, aluminum bromide, zirconium chloride and boron fluoride, and recovering the resultant derivatives of the aromatic hydrocarbon.

10. A process for the production of derivatives of aromatic hydrocarbons which comprises reacting an alkylatable aromatic hydrocarbon with a polychloroalkane containing at least one chlorine atom attached to a carbon atom to which is attached not more han one hydrogen atom and methylcyclopentane in the presence of a Friedel-Crafts type catalyst selected from the group consisting of aluminum chloride, aluminum bromide, zirconium chloride and boron fluoride, and recovering the resultant derivatives of the aromatic hydrocarbon.

11. A process for the production of derivatives of aromatic hydrocarbons which comprises reacting an alkylatable aromatic hydrocarbon with a polychloroalkane containing at least one chlorine atom attached to a carbon atom to which is attached not more than one hydrogen atom and a saturated hydrocarbon containing a tertiary carbon atom in the presence of aluminum chloride, and recovering the resultant derivatives of the aromatic hydrocarbon.

12. A process for the production of derivatives of aromatic hydrocarbons which comprises reacting an alkylatable aromatic hydrocarbon with a polyhaloalkane containing at least one halogen atom attached to a carbon atom to which is attached not more than one hydrogen atom and a saturated hydrocarbon containing a tertiary carbon atom in the presence of aluminum bromide, and recovering the resultant derivatives of the aromatic hydrocarbon.

13. A process for the production of derivatives of aromatic hydrocarbons which comprises reacting an alkylatable aromatic hydrocarbon with a polychloroalkane containing at least one chlorine atom attached to a carbon atom to which is attached not more than one hydrogen atom and a saturated hydrocarbon containing a tertiary carbon atom in the presence of zirconium chloride, and recovering the resultant derivatives of the aromatic hydrocarbon.

14. A process for the production of derivatives of aromatic hydrocarbons which comprises reacting an alkylatable aromatic hydrocarbon with a polyhaloalkane containing at least one halogen atom attached to a carbon atom to which is attached not more than one hydrogen atom and a saturated hydrocarbon containing a tertiary carbon atom in the presence of boron fluoride, and recovering the resultant derivatives of the aromatic hydrocarbon.

15. A process for the production of derivatives of benzene which comprises reacting benzene with a polyhaloalkane containing at least one halogen atom attached to a carbon atom to which is attached not more than one hydrogen atom and an alkylcycloparaffin containing a tertiary carbon atom in the presence of aluminum chloride, and recovering the resultant derivatives of benzene.

16. A process for the production of derivatives of benzene which comprises reacting benzene with 1,1-dichloro-3,3-dimethylbutane and methylcyclopentane in the presence of aluminum chloride, and recovering the resultant neohexylbenzene and (methylcyclopentyl)-benzene.

17. A process for the production of derivatives of benzene which comprises reacting benzene with 1,1-dichloroethane and decahydronaphthalene in the presence of aluminum chloride, and recovering the resultant ethylbenzene and phenyldecahydronaphthalene.

18. A process for the production of derivatives of benzene which comprises reacting benzene with 1,2-dichloro-2-methylpropane and methylcyclopenthane in the presence of aluminum chloride, and recovering the resultant isobutylbenzene and (methylcyclopentyl)benzene.

19. A process for the production of derivatives of benzene which comprises reacting benzene with 2,3-dibromobutane and methylcyclohexane in the presence of aluminum chloride, and recovering the resultant s-butylbenzene and (methylcyclohexyl)benzene.

20. A process for the production of derivatives of benzene which comprises reacting benzene with 1,1-dibromo-2-cyclohexylethane and isopentane in the presence of aluminum chloride, and recovering the resultant (2-cyclohexyl)benzene and pentylbenzene.

References Cited in the file of this patent

UNITED STATES PATENTS

| | | |
|---|---|---|
| 2,673,224 | Kennedy | Mar. 23, 1954 |
| 2,681,373 | Schenider | June 15, 1954 |